Oct. 18, 1938. D. TEATINI 2,133,594
FURNACE FOR PRODUCING SULPHUROUS GAS
Filed May 15, 1936 2 Sheets-Sheet 1

Inventor:
D. Teatini
By Glascock Downing & Seebold
Attys.

Oct. 18, 1938.  D. TEATINI  2,133,594
FURNACE FOR PRODUCING SULPHUROUS GAS
Filed May 15, 1936  2 Sheets-Sheet 2
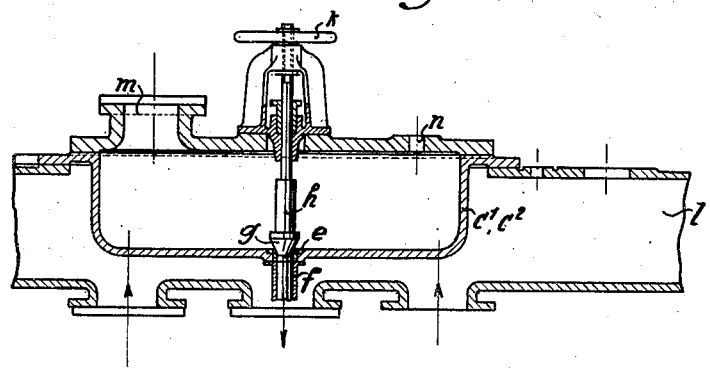
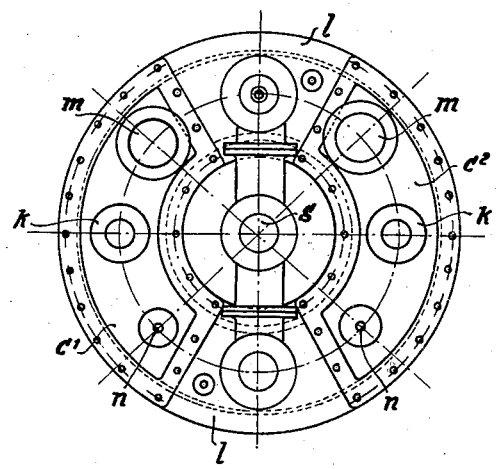

Patented Oct. 18, 1938

2,133,594

UNITED STATES PATENT OFFICE 2,133,594

FURNACE FOR PRODUCING SULPHUROUS GAS

Dario Teatini, Hougaerde, Belgium

Application May 15, 1936, Serial No. 79,984
In Belgium May 17, 1935

1 Claim. (Cl. 23—278)

This invention relates to improvements in sulphur burning apparatus.

It has been customary to employ for the production of sulphur dioxide gas, more particularly for use in the sugar industry, sulphur burning furnaces having a relatively flat hearth of elongated shape into which is run sulphur previously melted by the heat of the sulphur dioxide gas produced in the furnace. It has been found, however, that such a furnace has a tendency to be extinguished as soon as its output is restricted due to the fact that the sulphur dioxide unless rapidly removed from the hearth prevents the combustion of the sulphur. On the other hand, during normal working, it is necessary to introduce into the furnace an excess of air in order to counteract the extinguishing power of the sulphur dioxide gas as it travels over the relatively long path to the gas outlet and this excess of air in its turn produces a rise in temperature which results in the sublimation of a portion of the sulphur and this is carried away with the sulphur dioxide gas and deposited in the pipes. Such furnaces moreover, possess a low productive capacity relative to their size.

It is an object of the present invention to provide an improved sulphur burning furnace in which the production of sulphur dioxide is increased for a furnace of given floor space and in which the production of sulphur dioxide may be kept under complete control.

Following is a description by way of example and with reference to the accompanying drawings of one form of apparatus constructed in accordance with the present invention.

In the drawings, which show a sulphur burning apparatus comprising two superposed combustion hearths:

Figure 3 is a development view of the sulphur melting and feeding hearth; and

Figure 4 is a diagrammatic plan view of the furnace on a reduced scale.

Similar reference numerals denote similar parts throughout the drawings.

In the form shown, the furnace comprises two circular combustion hearths $a^1$ and $a^2$, superposed and alternating with water jackets $r^1$ and $r^2$. At their periphery, these hearths and jackets form outlet conduits $b^1$, $b^2$, $b^3$ ... $b^8$, which terminate in an annular chamber $l$ surmounting the furnace. These conduits may obviously be replaced by a continuous annular opening.

Figure 1:
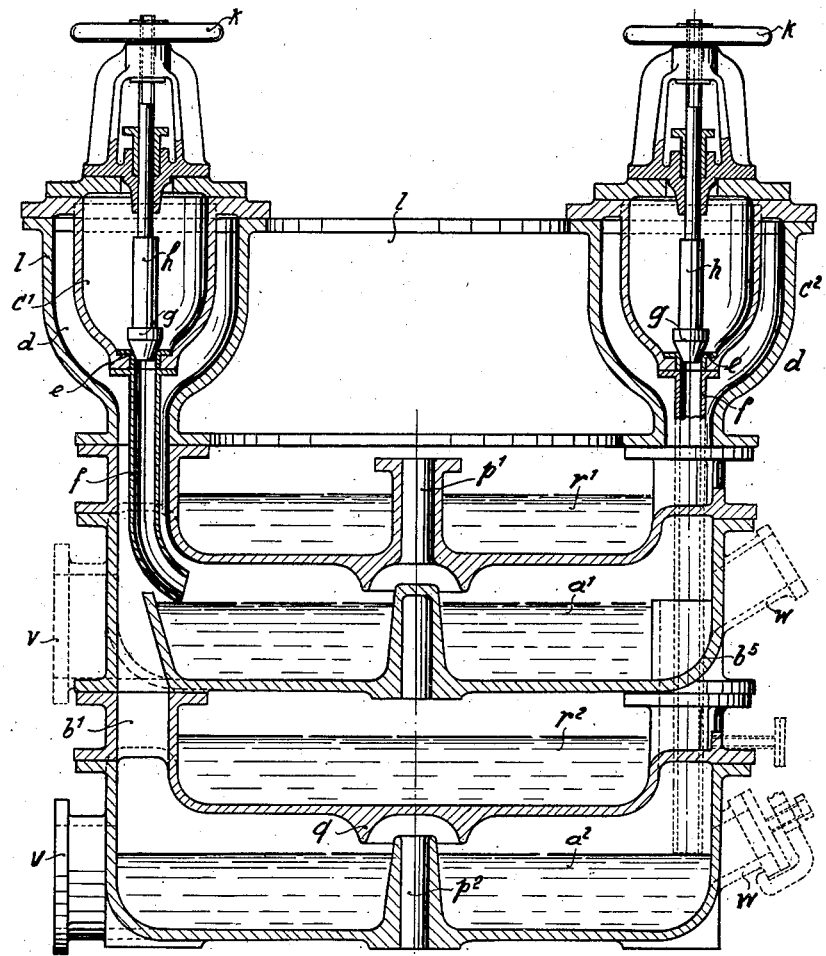
Figure 1 is a central vertical section through the reservoirs for the molten sulphur.
Figure 2:
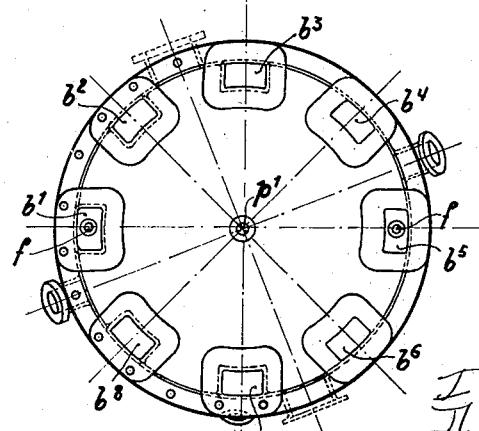
Figure 2 is a diagrammatic plan view on a smaller scale taken below the melting and feeding reservoirs.

Mounted in the annular chamber $l$ are two sulphur melting chambers $c^1$, $c^2$, so disposed as to leave between them and the walls of the chamber $l$ a space $d$ through which pass the hot gases from the combustion hearths $a^1$ and $a^2$. In the present case, these melting chambers are arcuate in form, see Figures 3 and 4. Each melting chamber $c^1$, $c^2$ is provided at its lower part with an orifice $e$ to which is connected a pipe $f$ opening above the combustion hearths $a^1$ and $a^2$, as shown in Figure 1. This orifice can be closed by a plug $g$ carried by a rod $h$ controlled by a handwheel $k$ or in any other manner. Furthermore, in its upper part, the reservoir $c^1$, $c^2$ is provided with a sulphur charging opening $m$ and an air inlet orifice $n$ (Figure 3). This air is intended to maintain in each melting chamber during the feeding operation a pressure equal to that in the hearths $a^1$ and $a^2$.

Finally, the cooling jacket $r^1$ is provided with a central pipe $p^1$, through which the compressed air necessary for the combustion of the sulphur contained in the upper hearth $a^1$ is introduced, while the lower hearth $a^2$ is pierced by a central pipe $p^2$ opening below a projection in the form of a deflector $q$ provided in the lower part of the cooling jacket $r^2$. Each combustion hearth in addition possesses an opening or openings $v$ for charging or discharging the hearth and an opening or openings $w$ for lighting the charge or for inspection purposes.

Upon starting up the furnace, the sulphur is introduced into the hearths $a^1$ and $a^2$ e. g. through the openings $v$ while when the furnace is fully working, the sulphur is charged into the melting chambers $c^1$ and $c^2$, where it is melted by the heat of the hot sulphur dioxide gas produced in the hearths $a^1$ and $a^2$ and passing through the spaces $d$ around the melting chambers. After opening the holes $e$, the molten sulphur passes through the pipes $f$ to the respective combustion hearths $a^1$ and $a^2$. The compressed air injected into the central pipes $p^1$ and $p^2$ passes over the liquid sulphur in the combustion hearths, forming sulphur dioxide which only remains in contact with the surface of the sulphur for that time taken to cover a distance approximately equal to the radius of the hearths, and as soon as it arrives at the periphery of the latter, it escapes through the vertical conduits $b^1$, $b^2$ ... $b^8$ to be collected in the annular chamber $l$ whence it leaves through the central main $s$ (Figure 4) to pass to the point where it is to be utilized. Since the sulphur dioxide gas is led away immediately it is produced, any danger of stifling or extinguishing the furnace is obviated.

Due to the superposition of the combustion hearths, it is possible to obtain a production of sulphur dioxide gas far higher than that given by known furnaces of equivalent bulk. At the same time the mutual independence of the melting chambers and feeding valves enables the production to be varied at will.

Constructional modifications may be made in the furnace just described without departing from the scope of the invention. Thus, for example, instead of employing a separate pipe $f$ for each combustion hearth, it is possible to feed directly with molten sulphur one or more upper hearths only, and allow the overflowing sulphur to run from the latter into one or more lower hearths.

What I claim is:

A sulphur furnace, comprising at least two combustion hearths, a central air inlet provided for each hearth and a cooling jacket between each two adjacent hearths, an annular chamber surmounting the furnace, conduits situated around the peripheries of the combustion hearths and leading to said annular chamber, a gas outlet in said chamber, reservoirs for the preliminary melting of the sulphur arranged in the said annular chamber so as to be surrounded by the sulphurous gas produced, a charging opening in the upper part of the said reservoirs, conduits extending from the bottoms of the reservoirs to each of the combustion hearths, and means interposed between the conduits and the reservoirs for regulating the flow of molten sulphur into the conduits.

DARIO TEATINI.